(No Model.) 4 Sheets—Sheet 1.
F. LACEY.
SHUTTLE BOX OPERATING MECHANISM FOR LOOMS.

No. 449,742. Patented Apr. 7, 1891.

Witnesses.
Albert L. Bodwell,
James E. Arnold

Inventor.
Fred Lacey
By Benj. Arnold
Atty.

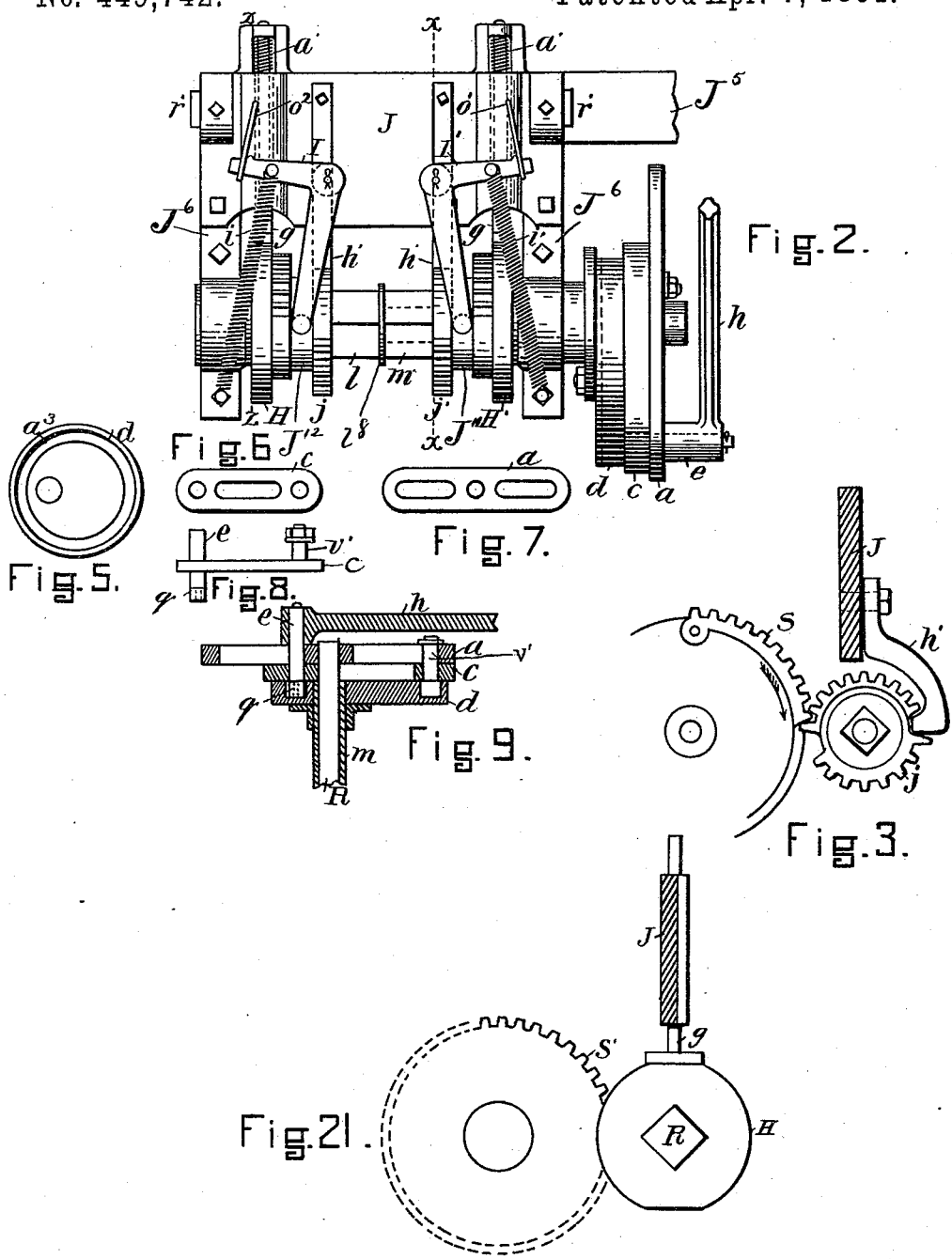

(No Model.) 4 Sheets—Sheet 3.
F. LACEY.
SHUTTLE BOX OPERATING MECHANISM FOR LOOMS.
No. 449,742. Patented Apr. 7, 1891.

WITNESSES,
Albert L Bodwell
James C Arnold

INVENTOR,
Fred Lacey
By Benj Arnold Atty (No Model.) 4 Sheets—Sheet 4.
F. LACEY.
SHUTTLE BOX OPERATING MECHANISM FOR LOOMS.
No. 449,742. Patented Apr. 7, 1891.
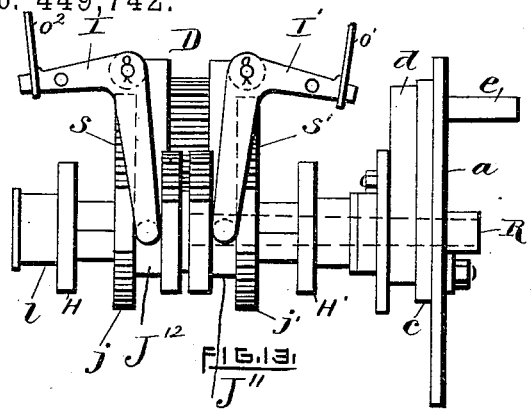
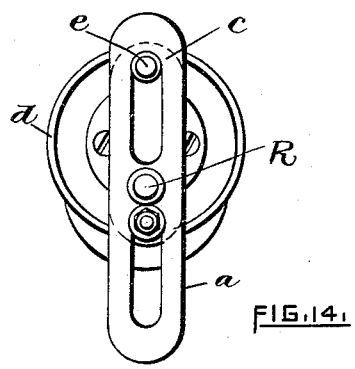
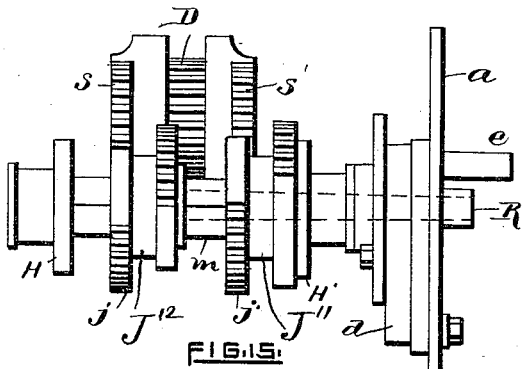
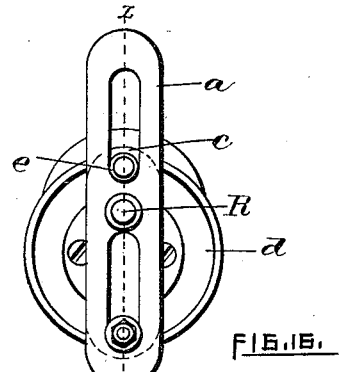
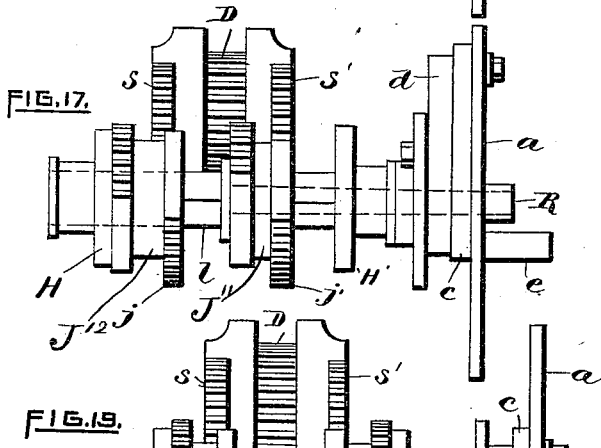
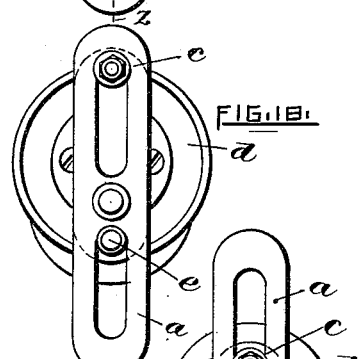
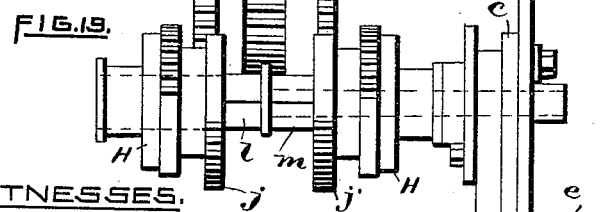
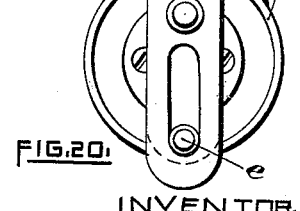
WITNESSES.
Albert L. Braswell.
James E Arnold
INVENTOR.
Fred Lacey
By Benj Arnold Atty

UNITED STATES PATENT OFFICE.

FRED LACEY, OF ADAMS, MASSACHUSETTS.

SHUTTLE-BOX-OPERATING MECHANISM FOR LOOMS.

SPECIFICATION forming part of Letters Patent No. 449,742, dated April 7, 1891.

Application filed July 21, 1890. Serial No. 359,435. (No model.)

*To all whom it may concern:*

Be it known that I, FRED LACEY, of Adams, in the county of Berkshire and State of Massachusetts, have invented certain new and useful Improvements in Shuttle-Box-Operating Mechanisms for Looms; and I do hereby declare that the following is a full, clear, and exact description thereof, reference being had to the accompanying drawings, and to the letters of reference marked thereon, which form a part of this specification.

The invention herein described belongs to that class of loom mechanisms known as "box-motions," which comprise those parts used in changing the positions of the shuttle-boxes in order to bring different shuttles into operation in the process of weaving.

Mechanism constructed in accordance with my invention operates after the manner of the favorite "crank-motion"—that is, it starts and stops the boxes easily and moderately, thereby avoiding the shocks that in some other forms of box-operating mechanism interfere with the attainment of high speed; also, it insures positive motion and support of the parts after motion, so that the operating parts cannot be reacted upon by the shuttle-boxes or the motion of other parts of the loom, and thereby be moved out of place. It provides for making simple and direct connections between the box-operating mechanism proper and the boxes with but few joints to wear in use and create an uncertainty of action.

Figure 1:
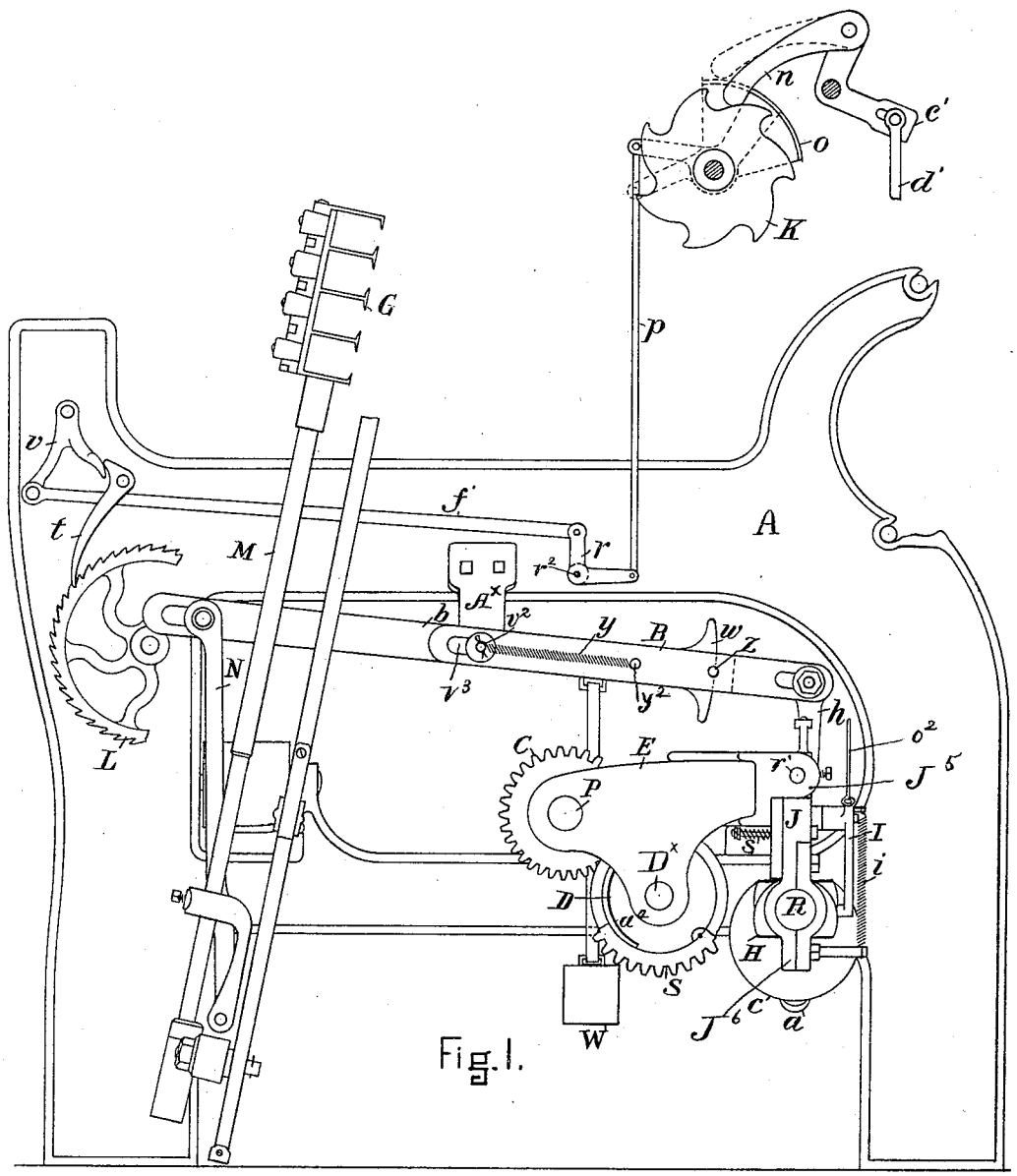
Figure 4:
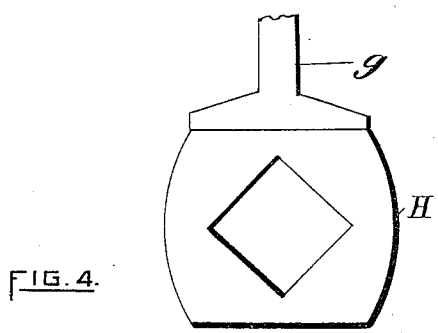
Figure 22:
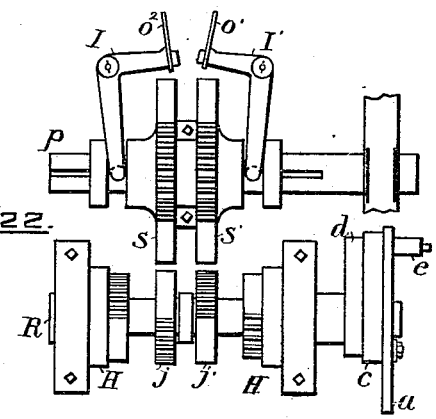
Figure 10:
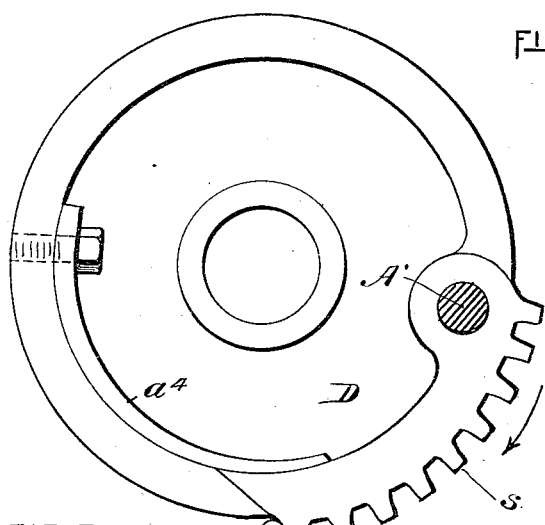
Figure 11:
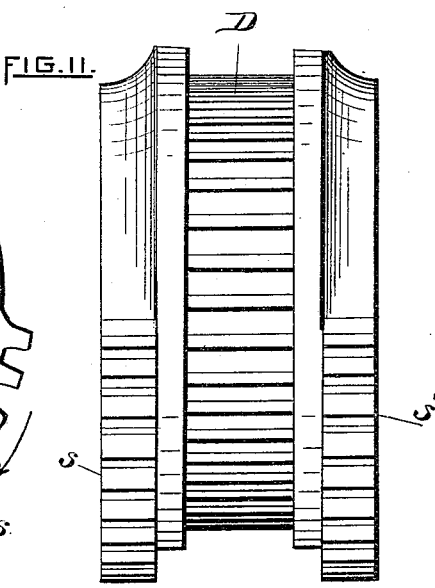
Figure 12:
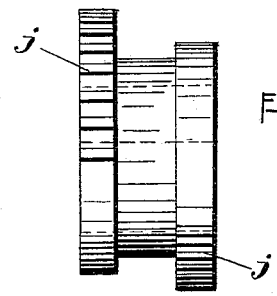

Figure 1 shows an elevation of the end of a loom having my invention applied thereto, those parts being left out that are not immediately connected with moving the boxes. Fig. 2 is a back elevation of the greater portion of the box-motion proper. Fig. 3 is a view in detail showing a sliding gear, its stop, and a driving segment-gear. Fig. 4 shows an evener $g$ and plate H. Figs. 5 to 8 show the parts of the eccentric and crank-motion separate. Fig. 9 shows a section of the parts seen in Figs. 5 to 8, together with the part of the shaft that carries the crank-plate, the sleeve that holds the grooved eccentric cam, and the connecting-link, all properly assembled. Fig. 10 is a side view of one of the driving segment-gears and the sliding segment-gear engaging therewith. Fig. 11 is a face view of the driving segment-gear shown in Fig. 10. Fig. 12 is a face view of the sliding segment-gear shown in Fig. 2. Figs. 13 to 20 are views illustrating the various positions of the parts of the box-operating mechanism proper at different stages of its operation, as will be hereinafter described. Fig. 21 is a view in detail showing a segment-gear, a plate H, and an evener $g$. Fig. 22 shows a modification of the box-operating mechanism.

In Fig. 1, which represents the end of a loom, A is the end frame. G represents four shuttle-boxes supported by the rod M. P is the lower or cam shaft, to the end of which the gear-wheel C is attached, this gear-wheel engaging with the middle toothed portion of wheel D. (Shown in Figs. 11, 13, 15, 17, and 19.) The position of this shaft P varies in the looms of different makes. In some looms this shaft is far enough back to receive the wheel D and not bring the box-motion too far toward the front of the loom, in which case the wheel C may be dispensed with and the wheel D made fast on the cam-shaft.

A plate J, by which most of the box-operating parts are supported, is held on an arm $J^5$, attached to the end frame A. This plate J has two dependent arms $J^6$, having bearings for a horizontal shaft R, which is a squared shaft with a bearing made on it at the left-hand end, Fig. 2, the square part of the shaft $l$ extending from this bearing to a ring $l^3$, opposite the middle of the plate J. From this ring it is turned down around, as shown by the dotted lines in Fig. 2, to the right-hand end of the shaft, where the slotted plate $a$ is attached to it, so as to be turned by it, as shown in Fig. 9. On this round portion of the shaft R is fitted to turn freely a sleeve $m$, square on its outside up to the right-hand bearing, through and beyond which it is made round to its end inside of the stud-plate $c$, and the grooved eccentric cam $d$ is made fast to the end of the sleeve just inside the plate $c$, the latter being placed between plate $a$ and cam $d$. On the solid square part $l$ of the shaft R, inside of the left-hand bearing, is placed the sliding segment-gear $J^{12}$, which is fitted to slide easily from the bearing to the middle ring. A similar sliding segment-gear $J^{11}$ is fitted to ride freely on the square sleeve $m$ from the middle ring to the right-hand bearing. By this arrangement the slotted plate $a$ on the extreme right-hand end of the shaft R is controlled by the sliding segment-gear $J^{12}$ on the square part $l$ of the shaft, and the grooved eccentric cam $d$, attached to the extreme end of the the sleeve $m$, will be controlled by the sliding segment-gear $J^{11}$ on the square part $m$ of the sleeve. The two sliding segment-gears $J^{11} J^{12}$ are moved back and forth on the shaft and sleeve, respectively, by means of the two knee-levers I I', which are pivoted at their angles on studs projecting from the plate J, so that the vertical arms of the levers extend down into position for studs or friction-rolls on their lower ends to fit into the grooved spaces shown in the said gears, the horizontal arms of the knee-levers T being connected by rods $o^2$ $o'$ to levers which are operated by the balls or rolls of a pattern-chain in a manner common in pattern-connections for box-motions.

The construction of each sliding segment-gear is as follows: Two half-circle gear-segments $j j$ or $j' j'$ are placed on opposite sides and ends of a hub, and a grooved space is left between them. One of such sliding segment-gears is shown in end view in Fig. 10 and in side view in Fig. 12. The said gears have communicated to them at appropriate times, determined by the pattern-connections, a movement of partial rotation by the driving segment-gears S S' on the sides of the gear-wheel D, the said wheel D being held on a shaft $D^{\times}$ in front of the shaft R, but near enough to it so that the segment-gears S S' will engage with the gear-segments $j j'$ when the latter come opposite to them. The segment-gears S S' on the wheel D are placed wide enough apart to come opposite to the inside gear-segments $j j'$ when the sliding gears $J^{11} J^{12}$ are farthest apart and opposite to the outside gear-segments $j j'$ when the sliding gears are nearest together. The gear-segments $j j'$ have about half a circle of teeth on each, and the segments on the wheel D, which wheel is twice as large in diameter as gears $J^{11} J^{12}$, have a quarter-circle of teeth each, so that when the driving-segments S S' engage with the other segments $j j'$ they give the latter exactly one-half of a turn.

The stop-plates H H each have flat places made on opposite sides of their peripheries, (see Fig. 4,) onto which the flat feet of the eveners $g$ press, so as to stop the plates at a certain point and "even" them if they stop short of or overrun a half-turn. The eveners $g$ are constructed of square bars fitted to slide in a vertical position in passages made for them in the plate J. Their upper ends extend above the plate and have open spiral springs $a'$ placed around them, the outer ends of which springs bear against straps passing over them from plate J, while their lower ends press against shoulders on the bars, so as to keep the feet or cross-bars in contact with the plates H H'. There are two of these eveners, they being so placed above the stop-plates that each one will be opposite to a plate. The feet of the eveners are raised by the circular parts of the plate H as they make a half-turn, and press on the other flat place when the half-turn is completed. The center gear of the wheel D is of the same size as the wheel C, that drives it, so that it shall make the same number of turns.

The parts of the eccentric and crank-motion are shown in Figs. 5 to 8, inclusive, and all together in section in Fig. 9. The grooved eccentric cam $d$ (shown separately in Fig. 5) has an annular groove $a^3$ in its face eccentric in position to the hole for the sleeve $m$ that carries it.

The stud-plate $c$ (shown in Figs. 6 and 8) has the stud or pin $e$ in one end, which stud passes through one of the slots in plate $a$, as shown, and holds the connecting-bar $h$ on its outer end, as shown in Fig. 9, and has a friction-roll $q$ on its other end, that runs in the eccentric groove $a^3$ in the face of cam $d$. It also has a slot in it to receive the shaft R. A stud $v'$ is made fast in the other end of the plate $c$, which projects up through one of the slots in the crank-plate $a$, and has a washer and nut on the end to keep the plate on.

The slotted plate $a$ (shown in Fig. 7) has a hole in its center, where it is attached to the end of the shaft R, and slots on each side of this hole to receive the studs in the plate $c$.

In Fig. 9, R is a part of the shaft, to the end of which the crank-plate $a$ is fastened. $m$ is the loose sleeve on the same shaft, to which the eccentric $d$ is fastened. The studs $e$ and $v'$ slide freely in the slots in the crank-plate $a$, as the groove in the eccentric cam moves the stud-plate $c$ by its action on the friction-roll $q$ on the pintle $e$.

In operating a four-box loom with this arrangement the positions and motions of the parts may be described as follows: Starting with the shuttle-boxes entirely down, the position of the mechanism will be shown in Figs. 13 and 14. Now, should a ball in the pattern-chain operate the lever to which the rod $o'$ is connected, the knee-lever I' will be moved to move the sliding segment-gear $J^{11}$ to the right and bring the inner segment $j$ in front of and into engagement with the driving segment-gear S', which will give one-half a turn to the sleeve $m$ and grooved eccentric cam $d$. This half-turn will change the position of the grooved eccentric cam to that shown in Figs. 15 and 16, and will carry the pin or stud $e$ down and raise the boxes up the distance of one box. If lever I' is now released, its spring $i'$ will act to move the sliding gear $J^{11}$ back into the position shown in Fig. 13, carrying the outer segment $j'$ into line with segment-gear S', so as to provide for again changing the position of the eccentric cam. If at the same time that lever I' is released by a blank on the pattern-chain a ball on the pattern-chain should operate the other knee-lever I by its chain-lever and the rod $o^2$, that knee-lever will throw the sliding segment-gear $J^{12}$ to the left and carry its inner segment $j$ in front of and into position for engagement with the driving segment-gear S. The engagement of the segment-gears S S' with segments on both sliding gears simultaneously, which now will take place, will move the parts into the position represented in Figs. 17 and 18 and bring the third box into line with the shuttle-race. Now, if the sliding segment-gear $J^{12}$ and slotted plate $a$ are maintained in the position represented in Figs. 17 and 18 by a ball of the pattern-chain continuing to draw up the knee-lever I, and the pattern and the pattern-chain again move the sliding segment-gear $J^{11}$ and the parts as first described, the grooved eccentric cam $d$ will receive another half-turn and will carry the pin $e$ one step lower—namely, to the positions shown in Figs. 19 and 20, which brings the lowest of the four boxes up to the level of the race of the loom. The order of these several motions may be reversed and the shuttle-boxes descend a box at a time as they ascended, or the shuttle-boxes may, if desired, be brought at once to any one position.

The "box-lever" (shown in Fig. 1) is composed of two parts connected together by a yielding device that allows one part to be moved positively and the other to remain stationary if it meets with sufficient obstruction to its motion. The two parts B and $b$ are held on the same stud $v^2$, made fast in a bracket $A^\times$ on the end frame of the loom. The part B has its stud-hole lengthened out to a slot $v^3$ to allow it to move away from the other part $b$, which has a segment $w$ formed on its end with a notch in the middle of it. The part B has a pin $z$ inserted in it in position to enter the notch in the part $w$, and a close spiral spring $y$ has one end attached to the stud $v^2$ and its other end fastened to a pin $y^2$ in the part B, so that the spring $y$ will draw the latter part toward the stud and hold the pin $z$ in the notch with sufficient force to carry motion to operate the boxes; but if something prevents the boxes from moving—as, for instance, if one of the shuttles does not enter its box entirely then the spring $y$ will yield and allow the pin $z$ to leave the notch in the lever $b$, and the part B will make its full motion while the part $b$ will remain stationary, and thus avoid breaking any part of the machine, and will remain in this position until after the loom has been stopped and the operative has adjusted the boxes again. This box-lever is connected at one end by the rod $h$ to the pin $e$, and may be connected at its other end to the box-rod M by the rod N, as shown, or in any of the usual ways of connecting to the boxes.

In driving one segment-gear by another in order to cause them to engage properly and have the first tooth of the driver enter the first space in the driven segment it has been the practice to leave out the second tooth of the driven segment-gear in order to avoid striking it with the first tooth of the driver; but this plan has the great disadvantage of throwing all the strain of starting the second segment and its connections upon the isolated first tooth of that segment until the next tooth comes into gear. My improvement consists in spacing the teeth of the driven segment uniformly and making the first tooth of the driven segment-gear longer, so that it can be readily caught by the first tooth of the driver without hitting the next tooth. In practice I also re-enforce the said first tooth on its under side to strengthen it. (See Fig. 10.) By this plan two teeth on each of the sliding segment-gears are brought into engagement with each other before the pin begins to raise the boxes. Another difficulty found in engaging one segment-gear with another is the liability of the first tooth of the driver to strike on the top of the tooth of the driven if the latter is slightly out of place. To prevent any damage from this cause, it has been customary to place the driven mechanism on a plate held up to its work by a spring that would yield if one tooth struck on the top of another. The great objection to this plan is the lack of rigidity necessary to insure positive action in the working parts, since they are liable to yield at any time. My plan is to make the driver with a movable yielding set of teeth, the drawings showing them pivoted at one end at A', Fig. 10, and held up in place by a spring $a^4$ at the other end. This leaves the plate J perfectly rigid at all times, and if the teeth of the two segments strike on their tops the spring-supported segment will yield and prevent any damage.

It will be readily seen from what has been described herein that where it is desired simply to change from one to the other of two shuttle-boxes, as in a two-cell box-motion the grooved eccentric cam and its described actuating devices alone are required. Again operative devices, such as herein described, suitable for a four-box loom, may in practice be combined with the parts required for a motion for a two-box loom by placing the latter on the other side of the driving-segments and arranging it to control the fulcrum-stud of the box-lever, and this combined mechanism would be capable of operating any number of boxes up to eight with the same ease of starting and stopping and accuracy of motion.

In looms as now constructed there is usually a connection made between the "weft stop-motion" and the "take-up motion," whereby the latter is stopped when the weft-fork indicates that the filling is lacking. This is as is shown in Fig. 1, where the knee-lever $v$ is made fast on the outer end of the usual shaft, to which an arm connecting with the carriage or slide of the weft-fork is attached. This lever $v$ is arranged to trip the retaining-pawl $t$ of the ratchet-wheel L and stop the take-up of the cloth when the weft stop-motion operates to stop the loom. To accomplish the same result for the feed-motion of the pattern-chain to stop it instantly upon the operation of the weft stop-motion and prevent the pattern-chain from moving another bar while the loom is stopping, an arm $o$, having a segment-plate on one end, is placed loosely on one end of the shaft of the chain driving-wheel K, so that when the other end of the arm is drawn down by the action the weft stop-motion, to which it is connected by the rod $p$, knee-lever $r$, held on a stud $r^2$ in the frame, rod $f'$, and arm $v$, the segment-plate on arm $o$ will be turned up under the dog $n$, that moves the chain-wheel K and stop the feed of the pattern-chain in order that it may be in the same position when the loom is started up again. This box-motion has this advantage: the position of the boxes can be read on any part of the chain, as each bar stands for a certain position of the boxes without regard to what may have passed before. Thus a chain bar with no balls indicates the top box in position to throw the shuttle, a chain bar with right-hand ball only indicates the second box, a chain bar with left-hand ball only indicates the third box, and a bar with both balls indicates the fourth box.

In the modification of my invention represented in Fig. 22 I have embodied a construction which is to a certain extent the equivalent of that heretofore described as embodied in the box-motion proper. In this modification the gear-segments $j\ j'$ are made fast to the shaft R and sleeve surrounding the same, respectively, and the segments S S' are separately mounted on shaft $p$, being splined thereto, as shown, to permit of their being moved longitudinally of the said shaft by the levers I I'.

Having thus described my improvements, what I claim as my invention is—

1. In combination with the connection $h$, and as a means for moving the same into different positions, a pin $e$, a slotted plate through the slot in which the said pin projects, a grooved eccentric cam into the groove of which the pin enters, and devices for imparting movements of rotation to the said slotted plate and grooved eccentric cam, as desired, all substantially as shown and set forth.

2. In combination with the connection $h$, and as a means for moving the same into different positions, a pin $e$, a slotted plate through the slot in which the said pin projects, a grooved eccentric cam into the groove of which the pin enters, a shaft carrying the slotted plate, a sleeve surrounding the shaft and carrying the grooved eccentric cam, and devices for imparting movements of rotation to the shaft and sleeve, as desired, all substantially as shown and set forth.

3. In combination with the connection $h$, and as a means for moving the same into different positions, a pin $e$, a slotted plate through the slot in which the said pin projects, a grooved eccentric cam into the groove of which the pin enters, a sliding plate interposed between the grooved eccentric cam and the slotted plate and carrying the pin $e$, and devices for imparting movements of rotation to the said slotted plate and grooved eccentric cam, as desired, all substantially as shown and set forth.

4. In combination with the connection $h$, and as a means for moving the same into different positions, a pin $e$, a slotted plate through the slot in which the said pin projects, a grooved eccentric cam into the groove of which the pin enters, a sliding plate interposed between the grooved eccentric cam and the slotted plate and carrying the pin $e$, a shaft carrying the slotted plate, a sleeve surrounding the shaft and carrying the grooved eccentric cam, and devices for imparting movements of rotation to the shaft and sleeve, as desired, all substantially as shown and set forth.

5. The combination, with a driving segment-gear, of a sliding gear having oppositely-placed gear-segments disposed out of line laterally with relation to each other and a stationary stop disposed in position to engage an end tooth of either gear-segment, according to the position into which the segment-gear is slid and detain the segment-gear from undue rotation, substantially as shown and described.

6. The combination, with the shuttle-boxes and the pin $e$ operatively connected therewith, of the slotted plate through the slot in which the said pin passes, the grooved eccentric cam into the groove of which the said pin enters, the shaft upon which the slotted plate is mounted, the sleeve upon which the grooved eccentric cam is mounted, gears having thereon oppositely-disposed gear-segments out of line laterally with respect to each other, operatively connected with the said shaft and sleeve, respectively, and segment-gears engaging with the said gear-segments, the said segment-gears and gears provided with oppositely-disposed gear-segments being constructed to have a lateral movement the one of them relatively to the other, as described, all as and for the purpose set forth.

7. The combination, with the shuttle-boxes and the pin $e$ operatively connected therewith, of the slotted plate through the slot in which the said pin passes, the grooved eccentric cam into the groove of which the said pin enters, the shaft upon which the slotted plate is mounted, the sleeve upon which the grooved eccentric cam is mounted, gears having thereon oppositely-disposed gear-segments out of line laterally with respect to each other, the said gears being free to move longitudinally of the shaft and sleeve, respectively, but compelled to rotate in unison therewith, and segment-gears engaging with the said gear-segments as the latter are brought into position for being engaged by the lateral movement of the gears, all as and for the purposes set forth.

8. The combination, with a gear having a segmental series of teeth, of a laterally-sliding gear having oppositely-disposed gear-segments out of line laterally with respect to each other, the first tooth of each gear-segment being longer than the remainder of the teeth thereof, substantially as described.

9. The combination, with a series of shuttle-boxes having a pin $e$ operatively connected therewith, of a grooved eccentric cam into the groove of which the pin enters, a carrier for the said cam, a gear mounted on said carrier with capacity for movement longitudinally thereof, but compelled to rotate in unison therewith, the said gear having thereon oppositely-disposed gear-segments out of line with each other, and a rotating driving segment-gear, all substantially as described.

10. The combination, with a driven segment gear, of a driving segment-gear having a yielding spring-supported toothed segment, substantially as described.

11. The combination, with a driven segment-gear, of a driving segment-gear having a toothed segment pivoted to the body thereof and spring-supported, substantially as described.

FRED LACEY.

Witnesses:
CHARLES H. HAWORTH,
WILLIAM FERGUSON.